United States Patent [19]

Fortuin et al.

[11] Patent Number: 5,370,889
[45] Date of Patent: Dec. 6, 1994

[54] MICROPOROUS FILM AND PROCESS FOR THE PRODUCTION THEREOF

[75] Inventors: Henricus M. Fortuin, Masatricht; Joseph A. P. M. Simmelink, Eijsden, both of Netherlands

[73] Assignee: DSM N.V., Heerlen, Netherlands

[21] Appl. No.: 89,608

[22] Filed: Jul. 12, 1993

Related U.S. Application Data

[63] Continuation of Ser. No. 836,370, Feb. 18, 1992, abandoned.

[30] Foreign Application Priority Data

Feb. 18, 1991 [NL] Netherlands ............... 9100278

[51] Int. Cl.$^5$ ............................................. B32B 27/32
[52] U.S. Cl. ..................... 428/339; 428/521; 526/348.1; 526/352
[58] Field of Search ............... 526/348.1, 352; 428/339, 521

[56] References Cited

U.S. PATENT DOCUMENTS

| | | | |
|---|---|---|---|
| 4,613,544 | 9/1986 | Barleigh | 428/315.5 |
| 4,829,096 | 5/1989 | Kitamura et al. | 521/79 |
| 4,833,172 | 5/1989 | Schwarz et al. | 521/62 |
| 4,873,034 | 10/1989 | Kono et al. | 264/41 |
| 4,948,544 | 8/1990 | Van Unen et al. | 526/348.1 |
| 4,987,025 | 1/1991 | Shiraki et al. | 526/348.1 |

FOREIGN PATENT DOCUMENTS 0378279  7/1990  European Pat. Off.

*Primary Examiner*—Joseph L. Schofer
*Assistant Examiner*—David Wu
*Attorney, Agent, or Firm*—Cushmam Darby & Cushman

[57] ABSTRACT

Microporous film of ultra high molecular weight polyethylene with a high degree of moisture vapor transmission rate and a permeability to air that lies within a narrow range and a process for the production of a film with a high degree of moisture vapor transmission rate and a permeability to air that lies within a narrow range from a polyolefine by extruding a solution of the polyolefine in a first solvent, followed by cooling, the removal of the solvent and stretching of the film, in which the surface of one and only one side of the film is brought into close contact with a second solvent for the polyolefine before the film is contacted with the cooling agent.

11 Claims, No Drawings

MICROPOROUS FILM AND PROCESS FOR THE PRODUCTION THEREOF

This is a continuation of application Ser. No. 07/836,370, filed on Feb. 18, 1992, now abandoned.

The invention relates to a microporous film of ultra high molecular weight polyethylene.

Such a film is known from EP-A-378 279, which describes a process for the production of microporous films from a solution of ultra high molecular weight polyethylene in an evaporable solvent.

This film presents the drawback that it is not very permeable to water vapour, which, particularly when the film is used as a breathing sandwich layer in clothing, leads to non-optimum comfort in wearing.

The aim of the invention is to provide a microporous film of ultra high molecular weight polyethylene that provides greater comfort in wearing than the known film.

This aim is achieved according to the invention because the film has a moisture vapour transmission rate of at least 7500 g/24 h.m² and a permeability to air of between 10 and 60 sec/50 ml.

The film according to the invention has a very great capability of transporting water vapour. In clothing this favourable property manifests itself as a great capability of discharging human exhalation and perspiration to the atmosphere, thanks to which the body and clothing remain pleasantly dry, even in the event of increased physical effort. The moisture vapour transmission rate of the film is at least 7500 g/24 h.m², preferably at least 10,000 g/24 h.m².

Surprisingly, the film according to the invention is not very permeable to air, in spite of its very high moisture vapour transmission rate. Although a certain permeability to air is desired to ventilate the area enclosed by the clothing, clothing material must provide a substantial degree of protection against the wind to prevent too great a cooling of the body. The limits between which the values of the permeability to air of the film according to the invention lie comprise an area within which both of the aforementioned requirements with respect to the permeability to air can be met simultaneously. The permeability to air of the film according to the invention lies between 10 and 60 s/50 ml, preferably between 15 and 50 s/50 ml.

It is noted that in EP-A-184 392 a microporous film of polyethylene with a moisture vapour transmission rate of 9800 g/24 h.m² and a permeability to air of 11.7 s/50 ml is used as a matrix for a filled film. The strength of the matrix film is less than 9 MPa. The molecular weight of the polyethylene is not specified but reference is made to the process disclosed in U.S. Pat. No. 4,539,256 for the production of this porous matrix film. The process described there is limited according to the specification to "polymers which are melt processable under ordinary melt processing conditions", a requirement that ultra high molecular weight polyethylene does not meet and hence this process is not applicable to ultra high molecular weight polyethylene.

An additional advantage of the film according to the invention is a great degree of waterproofness, also at an elevated pressure, as occurs in exposure to rain showers. The film according to the invention appears to be impermeable to water in liquid condition under high pressure, for example under a 50-m column of water.

A further advantage of the film according to the invention is the high strength, relative to the high degree of porosity and the high moisture vapour transmission rate, of at least 20 MPa, thanks to which a film with a thickness of more than 10 μm is already sufficiently resistant to the load that occurs in normal use of clothing. Preferably, the thickness of the film according to the invention is more than 10 μm. Microporous films of ultra high molecular weight polyethylene, hereafter referred to as UHMWPE, with a thickness of >10 μm are known from EP-A-355 214 but these films do not possess the favourable permeability to air of the film according to the invention and therefore have only poor ventilation properties. Moreover, this patent application mentions nothing about a particularly high degree of moisture vapour transmission rate of these films.

Another advantage of the film according to the invention is its high abrasion resistance and its high degree of resistance to chemicals. Because of this, the film can be used in clothing that is to provide protection against aqueous chemicals such as acids and bases, without affecting the comfort in wearing.

The film according to the invention is microporous and consists substantially of ultra high molecular weight polyethylene. A microporous film consists of an essentially continuous matrix structure containing small pores or channels. The size of these pores and channels is between 0.001 and 10 μm, preferably between 0.01 and 5 μm. UHMWPE is here understood to be linear polyethylene with fewer than 1 side chain per 100 carbon atoms, preferably fewer than 1 side chain per 300 carbon atoms, and a polyethylene of that kind that may also contain minor amounts, preferably less than 5 mol. %, of one or more copolymerised other alkenes, for example propylene, butylene, pentene, hexene, 4-methylpentene, octene, etc., which polyethylene or copolymer of ethylene has a weight average molecular weight of at least $0.5 \times 10^6$ g/mol. Such UHMWPE can be produced for example with the aid of a Ziegler or a Phillips process using suitable catalysts under known polymerisation conditions. The polyethylene may also contain minor amounts, for example at most 25 wt. %, of one or more other polymers, in particular an alkene-1-polymer, such as polypropylene, polybutylene or a copolymer of propylene with a minor amount of ethylene. The polyethylene may contain the usual additives, such as stabilizers, colourants, pigments, fillers and the like. The weight average molecular weight of UHMWPE is determined with the aid of the known methods such as Gel Permeation Chromatography and Light Diffusion or is calculated from the Intrinsic Viscosity (IV), determined in Decalin at 135° C. A weight average molecular weight of, for example, $0.5 \times 10^6$ g/mol corresponds to an IV, determined in Decalin at 135° C, of 5.1 dl/g according to the empirical equation $$M_w = 5.37 \times 10^4 [IV]^{1.37}.$$

Because the favourable properties of UHMWPE manifest themselves particularly at high molecular weights, the weight average molecular weight of the UHMWPE is preferably at least $10^6$ g/mol.

The invention also relates to a process for the production of a microporous film from a polyolefine by forming a solution thereof in an evaporable, first solvent into a film, passing the film through a bath containing a cooling agent and evaporating the solvent from the film at a temperature below the dissolution temperature and stretching the film in one or more directions in the plane of the film, wherein the film can have a thickness upwardly from about 10 micrometers. The film can be 140, 150 or 210 micrometers thick.

Such a process is also known from EP-A-378 279, in which UHMWPE is used as a polyolefin, wherein Examples 11, 12 and 13 therein respectively report a film having a thickness of 210 micrometers, 150 micrometers, and 140 micrometers.

A drawback of this known process is that the films to be produced therewith appear to have a moisture vapour transmission rate of about 7300 g/24 h.m$^2$ at the most.

The aim of the invention is to provide a process for the production of microporous films from a polyolefine with a very high moisture vapour transmission rate.

This aim is achieved according to the invention because the surface of only one side of the film is brought into close contact with a second solvent, preferably being a solvent for the polyolefine, before the film is contacted with the cooling agent.

With this process it appears to be possible to produce microporous films with a very high moisture vapour transmission rate of at least 7500 g/24 h.m$^2$. A large proportion, usually of at least 50% and when use is made of UHMWPE an even greater proportion, of the solution from which the film is formed and hence also the film formed from the solution consists of the first solvent. The same large proportion of the surface consists of this solvent and it is therefore very surprising that a close contact of this surface with a second solvent has such a great effect.

A further advantage of the process according to the invention is that the film obtained therewith has a permeability to air which, when the film is used as a breathing sandwich layer in clothing, has the effect of excellent comfort in wearing.

As evaporable solvents use is made of the known polyolefine solvents such as aliphatic, cycloaliphatic and aromatic hydrocarbons, for example toluene, xylene, Tetralin, Decalin, $C_6$–$C_{12}$-alkanes or petroleum fractions, but also halogenated hydrocarbons, for example trichlorobenzene and other known solvents. In connection with the removal of the solvent, use is preferably made of solvents whose boiling points at atmospheric pressure are lower than 210° C. which is the case with virtually all of the aforementioned solvents.

As polyolefine use is preferably made of polyethylene or polypropylene or copolymers thereof with at most 5 mol. % of one or more other alkenes. Polyethylene is preferred on account of its greater resistance to many chemicals and its greater abrasion resistance. Because in particular polyethylene with a high or a very high molecular weight has these properties, use is preferably made of ultra high molecular weight polyethylene. Such UHMWPE has a molecular weight of at least $5 \times 10^5$ g/mol, preferably of at least $10^6$ g/mol.

Homogeneous solutions should be used to produce films from solutions of a polyolefine. The known methods, for example employing an extruder, can be used for the continuous production of homogeneous solutions of a polyolefine. Using this method presents the advantage that the solution can be prepared and extruded into a film or processed into a film in a different manner in one continuous process. The invention is not limited to such a process though and to a person skilled in the art it will of course be clear that homogeneous solutions prepared in a different manner can also be processed into microporous films.

The concentration of the polyolefine in the solutions may vary within wide limits and will usually be chosen between 2 and 50 wt. %, for practical reasons mainly. Solutions containing less than about 2 wt. % polyolefine usually result in films that are so fragile that it is extremely difficult to process them further. On the other hand, solutions containing more than 30 wt. %, in the case of UHMWPE, and, in other cases, in particular more than 50 wt. %, become increasingly difficult to process. Concentrated solutions with polyolefine concentrations of 50 wt. % or more are therefore not preferable although it is possible to use such solutions and the use thereof is hence within the scope of the present invention. If a portion of the polyolefine is cross-linked before it is dissolved, the processability of the solution appears to be better in a few cases than if the solution contains the same total concentration of only non-cross-linked polyolefine. This applies to UHMWPE in particular.

The polyolefine solution is converted into a film that consists of the solution. This can be done in different manners, for example by spinning it via a spinneret with a very wide slit-shaped nozzle, by extruding it or by pouring it onto a roll or a band.

After a polyolefine solution has been processed into a film the film consisting of the solution is passed through a cooling bath containing cooling agent. Preferably, use is made of a cooling agent in which the polyolefine is not soluble. Water is a very suitable cooling agent. The temperature is reduced to such an extent in the cooling process that gelling takes place in the film so that a structure is formed that is strong and stable enough for further processing. It is possible to cool to ambient or an even lower temperature but since the first solvent is to be evaporated from the film in the next process step it will be clear that, for a profitable process, it is very desirable to keep the temperature as high as possible in general. The amount of heat required to remove the solvent from the film is thus limited as much as possible.

The first solvent is removed from the film at a temperature below the dissolution temperature preferably by evaporation, but extraction is possible also. The dissolution temperature is the temperature above which the polyolefine in question can be homogeneously dissolved in the first solvent. If this solution is cooled to below the dissolution temperature gelling will take place. The dissolution temperature and the gelling temperature may differ from one another to a limited extent. In that case, according to the present invention, the first solvent is evaporated from the film at a temperature below the lowest of those temperatures.

If the forming method employed permits it, the film may be prestretched if so desired; this means that the linear rate at which the gelled film is drawn from the bath or transported differs from the linear rate at which the film is formed from the solution. When use is made of, for example, extrusion the latter rate is the linear rate at which the solution emerges from the die opening. Within the scope of the present patent prestretching is defined as the quotient of the rate at which the film is transported or drawn from the bath, as described above, and the aforementioned rate at which the solution emerges from the die opening.

In the evaporation of the first solvent the film shows a tendency to shrink. In order to obtain a microporous film this shrinkage must be prevented in at least one direction lying in the plane of the film. This can be done in a simple manner by clamping the film. If the film is clamped in two directions, its thickness is the only dimension that can, and in fact does, decrease. Something similar holds for, for example, tubular film and hollow filaments. It is not only possible to prevent shrinkage but even to stretch the film in one or two directions already during the evaporation of the solvent.

It is also possible to stretch the film in one or more directions after the evaporation of the first solvent from the film. This stretching of the film from which the solvent has been removed may optionally be carried out at a higher temperature than that at which the stretching during the evaporation of the solvent was effected, provided that this higher temperature is not so much higher than the melting temperature of the polyolefine that melt fracture occurs.

In the process according to the invention the surface of only one side of the film consisting of the solution is brought into close contact with a second solvent before the film is cooled to a gel film through contact with the cooling agent in the cooling bath. Although the contact of only a portion of the surface with the second solvent causes the moisture vapour transmission rate to increase, it is preferable, for the purpose of simplifying the process and obtaining a film with uniform properties, to bring the entire surface into close contact with the second solvent.

The close contact can be effected for example by spraying one side of the film with the second solvent in the form of a vapour, a spray or droplets. Excellent results are obtained when a layer of the second solvent floats on the actual cooling agent in the cooling bath. When the film is introduced into the cooling bath it then first passes the layer of the second solvent, with which it comes into close contact before coming into contact with the cooling agent beneath the solvent layer. Preferably, use is therefore made of this embodiment of the process according to the invention, preferably under the conditions described below.

The density of the second solvent must in this case be smaller than that of the cooling agent. When water is used as a cooling agent this requirement is met by most polyolefine solvents. The thickness of the layer of second solvent is not critical. The solvent must form a closed layer though and may not form globules on the surface of the cooling agent. This requirement is usually met if the layer of solvent is a few, for example 2, millimeters thick. For a person skilled in the art it is easy to experimentally determine the minimum thickness for obtaining a closed layer for any combination of cooling agent and second solvent. In order to prevent the risk of the layer breaking a layer thickness of at least 3 mm is preferably chosen. Preferably, an evaporable solvent is used as second solvent too. This presents the advantage that it can be removed together with the first solvent already in the film in one and the same evaporation step. For an economic process the second solvent is most preferably the same as the first solvent.

The layer of second solvent is applied to the surface of the cooling bath in such a manner that only one side of the film is brought into close contact with this solvent when the film is introduced into the cooling bath. For example, it is possible to place sufficient screen walls at suitable places in the cooling batch, which screen walls project below and above the surface of the cooling agent and are set perpendicular to this surface. In this way it is also possible to substantially limit the area of the surface of the cooling bath on which there is a layer of solvent. A suitable geometry of such screen walls can also ensure that only a part of the surface of the side of the film in question comes into contact with the second solvent.

The invention is illustrated with the aid of the following examples without, however, being limited hereto. The quantities mentioned in the examples were determined in the following manners.

The tensile strength, the elongation at break and the modulus of elasticity were determined according to ASTM standard D882-83, using a specimen with a width of 5 mm and a length between the jaws of 25 mm. The crosshead speed was 25 mm/min.

The moisture vapour transmission rate was determined as the Moisture Vapour Transmission Rate (MVTR), in g/24h.m$^2$, according to ASTM standard E96-66BW, at a temperature of 23° C., 50% relative humidity and an air flow rate of 2 m/s. The permeability to air was determined in s/50 ml as the Gurley number according to ASTM standard D726-58, using a measuring area of 6.45 cm$^2$ (1 square inch) and a weight of 567 grams. The thickness of the films was measured with the aid of a Millitron Feinprüf meter, whose sensor had a rounding off radius of 12 mm.

The density of the film was determined by weighing a piece of film with a known volume.

The porosity was determined from the measured density $\rho$ and the density of the polyolefine bulk material $\rho_0$ as:

$$\text{porosity} = \frac{\rho_0 - \rho}{\rho_0} \times 100\%$$

The maximum pore size was determined with the aid of a Coulter porometer.

The Intrinsic Viscosity was determined in Decalin at 135° C. The waterproofness of the film was determined as the height in meters of the water column that could be placed on the film before water started to pass through the film under the influence of the weight of the water column. The loaded area measured 17.3 cm$^2$. The film is supported by a metal grid.

EXAMPLE I

A 20 wt. % solution of polyethylene with an Intrinsic Viscosity of 15.5 dl/g, which corresponds to a weight average molecular weight of $2.2 \times 10^6$ g/mole, in Decalin was extruded at a temperature of 180° C. The extruder head was fitted with a die with a gap of 400 mm×1 mm. The extruded film was introduced into a cooling bath that contained water of 20° C., onto which a 3–4-mm thick layer of Decalin had been applied so that one side of the film came into contact with the Decalin as the film was introduced into the cooling bath. To this end three 6-cm high screen walls had been placed in the cooling bath, perpendicular to the surface of he cooling bath, so that half of each screen wall projected below this surface and half above this surface. Viewed in cross section, the three screen walls together constituted a screen shaped like an isosceles trapezium, whose short parallel side was missing. The open side of the screen was about 2 mm wider than the width of the extruded film. The screen was positioned so, relative to the die gap, that the film that was extruded virtually vertically passed the surface of the cooling bath at the open side of the screen. In this manner the extruded film partially took the place of the missing side, so that a virtually entirely enclosed area was formed at the surface of the cooling bath. Decalin was introduced into this area so that the side of the film that faced the interior of the area came into contact with Decalin over its entire width. Only a small amount of the Decalin leaked from the area via the narrow gaps between the sides of the film and the ends of the oblique sides of the screen. The Decalin layer was maintained at the same thickness by constantly supplementing Decalin. The surface of the Decalin layer was about 1 mm below the outlet of the die gap. The suitable flow rate maintained in the cooling bath ensured that the Decalin leaking from the area was led away, in a thin layer on the surface, from the side of the extruded film that did not face the area, which did thus not come into contact with the Decalin, but was introduced directly into the water. The solvent was removed from the gel film thus obtained in an oven at a temperature of 70° C., in which the length and width of the film were kept constant. The film from which solvent had been removed was simultaneously stretched in machine (M) and transverse (T) direction at a temperature of 120° C.

Table 1 shows the properties of the stretched film at different stretch ratios.

TABLE 1

| Stretch ratio [M × T] | 5 × 5 | 7 × 7 |
|---|---|---|
| Thickness (μm) | 69 | 48 |
| Porosity (%) | 82 | 84 |
| Max. pore size (μm) | 0.15 | 0.21 |
| MVTR (g/24 h · m$^2$) | 11960 | 13110 |
| Gurley number (s/50 ml) | 19.2 | 39.5 |
| Tensile strength [M/T] (MPa) | 30/27 | 27/27 |
| Modulus [M/T] (MPa) | 580/290 | 300/230 |
| Elongation at break [M/T] (%) | 18/31 | 15/18 |

EXAMPLE II

The procedure described in Example I was repeated, with the difference that only the length of the film was kept constant during the evaporation of the solvent, in this case at 30° C. Next, the film was stretched at a temperature of 120° C., first in machine direction and then in transverse direction. No shrinkage was allowed in the direction in which the film was not being stretched.

Table 2 shows the properties of the stretched film at different stretch ratios.

TABLE 2

| Stretch ratio [M × T] | 7 × 8 | 6 × 9 | 5.5 × 5.5 |
|---|---|---|---|
| Thickness (μm) | 27 | 37 | 62 |
| Porosity (%) | 80 | 84 | 83 |
| Max. pore size (μm) | 0.13 | 0.14 | 0.21 |
| MVTR (g/24 h · m$^2$) | 12300 | 13990 | 13090 |
| Gurley number (s/50 ml) | 47.5 | 25.8 | 24.2 |
| Watertightness (mH$_2$O) | >50 | >50 | >50 |
| Tensile strength [M/T] (MPa) | 46/44 | 35/39 | 29/19 |
| Modulus [M/T] | 570/510 | 400/430 | 290/250 |
| Elongation at break [M/T] (%) | 16/22 | 19/22 | 18/27 |

EXAMPLE III

The procedure described in example II was repeated, with the difference that use was made of a 30 wt. % solution in Decalin of high-density polyethylene with an Intrinsic Viscosity of 4 dl/g, which corresponds to a weight average molecular weight of about 360,000. Table 3 shows the properties of the stretched film at different stretch ratios.

TABLE 3

| Stretch ratio [M × T] | 6 × 5 | 6 × 6 |
|---|---|---|
| Thickness (μm) | 83 | 62 |
| Porosity (%) | 84 | 83 |
| MVTR (g/24 h · m$^2$) | 12000 | 12900 |
| Gurley number (s/50 ml) | 30.2 | 26.4 |

EXAMPLE IV

The procedure described in example III was repeated, with the difference that the layer of Decalin on the cooling bath was replaced by a 5-mm thick layer of xylene. Table 4 shows the properties of the stretched film at different stretch ratios.

TABLE 4

| Stretch ratio [M × T] | 6 × 5 | 7 × 7 |
|---|---|---|
| Thickness (μm) | 80 | 51 |
| Porosity (%) | 82 | 83 |
| MVTR (g/24 h · m$^2$) | 12410 | 13540 |
| Gurley number (s/50 ml) | 28.1 | 24.2 |

Comparative Example A

Example II was repeated, with the difference that no layer of solvent was applied to the cooling bath so that both sides of the extruded film came into direct contact with the water. The solvent was removed from the film, which was then stretched successively in machine and transverse direction. Table 5 shows the properties of the film.

TABLE 5

| Stretch ratio [M × T] | 4.5 × 8 | 5 × 9 |
|---|---|---|
| Thickness (μm) | 69 | 48 |
| Porosity (%) | 76 | 80 |
| MVTR (g/24 h · m$^2$) | 7250 | 7440 |
| Gurley number (s/50 ml) | 171.2 | 173.5 |

Both the moisture vapour transmission rate and the permeability to air of the films obtained in this manner are lower than those of the film according to the invention.

Comparative Example B

Example II was repeated, with the difference that a layer of Decalin was now applied to the cooling bath in such a manner that both sides of the extruded film came into close contact with the Decalin as the film was introduced into the cooling bath. The solvent was removed from the film, which was then successively stretched in machine and transverse direction. Table 6 shows the properties of the film.

TABLE 6

| Stretch ratio [M × T] | 5 × 10 | 5 × 9 | 5 × 7 |
|---|---|---|---|
| Thickness (μm) | 44 | 57 | 81 |
| Porosity (%) | 84 | 84 | 84 |
| Max. pore size (μm) | 2.7 | 3.1 | 4.3 |
| MVTR (g/24 h · m$^2$) | 13190 | 12800 | 12250 |
| Gurley number (s/50 ml) | 3.5 | 1.6 | 2.4 |
| Watertightness (mH$_2$O) | 15 | 7 | 10 |
| Tensile strength [M/T] (MPa) | 13/28 | 7/25 | 7/22 |
| Modulus [M/T] (MPa) | 170/290 | 90/280 | 80/230 |
| Elongation at break [M/T] (%) | 25/14 | 34/13 | 33/13 |

The permeability to air of the film thus obtained is greater than that of the film according to the invention.

We claim:

1. A microporous film of ultra high molecular weight polyethylene which has a thickness of at least about 10 micrometers up to about 210 micrometers, a moisture vapor transmission rate of at least 7500 g/24 h.m² to about 14,000 g/24 h.m², a permeability to air of between 10 and 60 seconds per 50 ml, and a pore size of from 0.001 to 10 micrometers.

2. A microporous film according to claim 1, wherein said film has a moisture vapour transmission rate of at least 10,000 g/24 h.m².

3. A microporous film according to claim 1, wherein said film has a permeability to air of between 15 and 50 sec/50 ml.

4. A microporous film according to claim 1, wherein said film has a thickness of up to about 83 micrometers.

5. A microporous film according to claim 1, wherein the average molecular weight of the polyethylene is at least $10^6$ g/mole.

6. A microporous film according to claim 1 having a moisture vapor transmission rate of 13990 g/24 h.m².

7. A microporous film according to claim 1, wherein said film has a thickness of up to about 69 micrometers.

8. A microporous film of ultra high molecular weight polyethylene having a moisture vapor transmission rate of at least 10,000 g/24 h.m² to 13,990 g/24 h.m², and a permeability to air of between 10 and 60 sec/50 ml, the film having a thickness of between about 10 and about 210 micrometers and a pore size of from 0.00 to 10 micrometers.

9. A microporous film of ultra high molecular weight polyethylene having a moisture vapor transmission rate of at least 7500 g/24 h.m² to 13,990 g/24 h.m², a permeability to air of between 10 and 60 seconds per 50 ml and a pore size of from 0.001 to 10 micrometers, the film having a thickness of between about 10 and about 210 micrometers.

10. A microporous film according to claim 9, wherein said film has a thickness of up to about 150 micrometers.

11. A microporous film according to claim 9, wherein said film has a thickness of up to about 140 micrometers.

* * * * *

UNITED STATES PATENT AND TRADEMARK OFFICE
CERTIFICATE OF CORRECTION

PATENT NO. : 5,370,889
DATED      : December 6, 1994
INVENTOR(S): FORTUIN et al.

It is certified that error appears in the above-indentified patent and that said Letters Patent is hereby corrected as shown below:

Claim 8, Column 10, line 8, change "0.00" to -- 0.001 --.

Signed and Sealed this

Twenty-fifth Day of April, 1995

Attest:

BRUCE LEHMAN

Attesting Officer   Commissioner of Patents and Trademarks